Patented Mar. 12, 1940

2,192,952

UNITED STATES PATENT OFFICE 2,192,952

NONHYGROSCOPIC STARCH CONVERSION PRODUCT AND METHOD OF MANUFACTURE

Ottomar Wolff, Berlin, Germany, assignor to American Maize-Products Company, a corporation of Maine No Drawing. Application March 22, 1938, Serial No. 197,423. In Germany January 14, 1931

4 Claims. (Cl. 127—29)

My invention relates to starch conversion products and more particularly to a substantially dry, solid, substantially nonhygroscopic corn starch conversion product and its method of manufacture.

This application is a continuation in part of my application Ser. No. 686,187, filed August 21, 1933 and is a companion application to my application Ser. No. 196,899 filed March 19, 1938. This companion application discloses a process of producing relatively nonhygroscopic dried corn syrup by controlling the dextrose content to a relatively low amount. The present application discloses a process for producing substantially nonhygroscopic dried syrups having a higher dextrose content.

For many years there has been a desire in the corn products industry to produce a dry, solid product from corn syrups, that on exposure to the atmosphere would remain as a stable, dry, solid material. Such a product would be easily handleable and could be conveniently packaged in cardboard boxes, paper containers, sacks, etc. Due to the relatively light weight of the dry product and that of the suitable containers as compared with the heavy liquid corn syrup and its usual metal containers, it could be shipped economically. Another advantage of an anhydrous solid dried corn syrup is that it would contain dextrose in readily assimilable form and therefore would be a desirable constituent of infant food; also it would be useful as a filler and nutritive material for ice cream, confections and bakery products.

In view of the recognized advantages and wide potential uses of a solid dry corn syrup product numerous attempts have been made heretofore to dry corn syrup to a permanent solid form. As far as I am advised however none of these attempts has been successful in producing a commercially satisfactory product; the principal difficulty being the strong hygroscopic properties of the corn syrup which prevent the production of a dry, stable, storable, relatively nonhygroscopic, solid product. The solid corn syrup products heretofore suggested were hygroscopic and therefore would not remain dry in storage or during shipment. It has proven difficult to effect substantially complete dryness in these products initially and even when reduced to a fine powder they would readily absorb moisture from the atmosphere and accordingly disintegrate or lose the desired dry powdery form by lumping and caking together. The term "nonhygroscopic" as used in the specification and claims herein to identify the products of my present invention is intended to cover principally those products that are sufficiently nonhygroscopic to permit shipping in the ordinary manner without undue lumping or caking of the material over a reasonable period of time.

The solid starch degradation products containing about 65% or more of dextrose are relatively nonhygroscopic. Also it is now known, as pointed out in my companion application, that one can manufacture starch conversion products having relatively low dextrose content and which may contain dextrin, that are relatively nonhygroscopic. These conversion products for this invention preferably have a dextrose content of not over about 32% (on a dry weight basis). Somewhat higher values may sometimes be used but this value should never exceed about 36%. At the low end, it ordinarily will not be necessary to stay much below about 24% of dextrose on the dry weight basis. The present invention provides a simple and efficient blending process for obtaining dry, noncaking, relatively nonhygroscopic solid products whose reducing sugar content comes preferably within the intermediate range of about 32% to 54% dextrose, this range being obtained by blending products of relatively high dextrose content such as those higher than 65% with products of relatively low dextrose content such as those under about 32% down to about 24% or lower.

Since, as described above, the starch degradation products containing about 65% or more reducing sugar content are practically nonhygroscopic whereas the intermediate products are comparatively hygroscopic, it is believed that the components which possess the principal hygroscopic properties disappear during the conversion to the higher dextrose content of 65% or more. This higher reducing sugar content calculated as dextrose is normally produced by a longer reaction of the starch with the acid under standard temperature and pressure conditions. With regard to the starch degradation products whose reducing sugar content is low enough to show no substantially hygroscopic properties, it is believed that their starch molecules have not been disrupted to a sufficient extent to produce the hygroscopic components present in the intermediate conversion products. While I do not wish to limit my invention to any theory, it is possible that the starch degradation products at the lower end of the above discussed dextrose range and at the higher end of this range contain little or none of the hygroscopic substance (which is probably a disaccharide or a trisaccharide) and for that reason are nonhygroscopic. Also it may be that the colloidal materials in the starch degradation products, including the dextrins, serve to render the converted product less hygroscopic.

In carrying out my invention, I produce a starch conversion liquor by the usual methods of conversion containing not over about 36% and advantageously not over about 29% of dextrose based on the dry weight. However, the dextrose content may be very much lower, ranging down to any desired figure. I have definitely used material having as little as 24% of dextrose based on the dry weight and it may be possible to use less. Another quantity of syrup should at the same time be produced by carrying on the conversion until the hygroscopic component largely disappears; for example, until the dextrose content is about 65% or more based on the dry weight. The conversion may be carried to any desired top limit. The two syrups are then mixed in proportion to give the desired dextrose content in the final product. The mixed syrup is then purified according to practice as usual in syrup manufacture, decolorized in any desired way, and finally dried, as for example, by the use of spray drying equipment or a drum dryer or in any other desired manner.

Very favorable products have been obtained, for example, by mixing 24 parts of a thin liquor having a dextrose content of about 24% based on the dry weight of solids with 16 parts of a thin liquor having a dextrose content of about 75% based on the dry weight of solids, and then drying the resulting mixture.

Since the material that I use having the maximum initial dextrose content ranges between 65% and 95%, and since the material that I use having the minimum dextrose content ranges between about 24% and less than 32%, it follows as a matter of mathematics that to get a range of final product falling between 32% and 54%, I must use anywhere between an appreciable amount and about 72% of the material having the higher dextrose content and the balance is to be made up of material having the lower dextrose content. Within these ranges, one can get final products having between 32% and 54% of dextrose and if the ingredients are mixed within these ranges, good results are had. The foregoing figures should be understood to represent the reducing substance content calculated to dextrose on a dry weight basis.

Obviously, a great many other proportions and mixtures may be made in accordance with the foregoing specification without departing from the spirit of my invention.

What I claim is:

1. The method of preparing a dry substantially nonhygroscopic product from starch syrups, said product containing between about 32% and about 54% of reducing sugars calculated as dextrose, and other starch degradation products including dextrins, which comprises mixing a liquor containing a highly saccharified starch product of which over about 65% of the solids is reducing sugars calculated as dextrose on a dry weight basis, with a liquor containing less saccharified starch products of which between about 24% and about 32% of the solids is reducing sugars calculated as dextrose on a dry weight basis, both liquors also having other nonsolid contents thereof consisting primarily of dextrins and concentrating the mixture to a dry form.

2. The method as specified in claim 1, in which the less saccharified syrup has about 24% but less than about 29% of the solids as reducing sugars calculated as dextrose on the dry weight basis and the amount of the more highly saccharified syrup employed ranges from a minimum appreciable amount to a maximum amount of about 72%.

3. A method of producing a substantially dry, storable, noncaking, solidified starch syrup product having a reducing sugars content of between about 32% and 54% on a dry weight basis which comprises blending, in proper proportions to produce said dextrose content, a converted starch liquor the reducing sugar content of which is about 65% to 95% and is sufficiently high to render the dried product therefrom storable and noncaking, with a converted starch liquor, the reducing sugar content of which is between about 24% and 36% and is sufficiently low to render the dried product therefrom storable and noncaking, and drying the mixture of said liquors to produce a dry, storable noncaking product, the reducing sugar content of which is within the said range of about 32% to 54% and is intermediate that of said high conversion syrup and said low conversion syrup and within a range that would normally characterize a hygroscopic product produced by direct conversion without blending, the amount of the high conversion syrup present in the final dried nonhygroscopic product ranging from a minimum appreciable amount up to a maximum of about 72%.

4. A substantially dry, storable, noncaking, solidified starch syrup product having a reducing sugars content of between about 32% and 54% on a dry weight basis, resulting from blending in proper proportions to produce said reducing sugars content a converted starch liquor the reducing sugars content of which is between about 65% and 95% and is sufficiently high to render the dried product therefrom storable and noncaking, with a converted starch liquor, the reducing sugars content of which is between about 24% and 36% and is sufficiently low to render the dried product therefrom storable and noncaking, and drying the mixture of said liquors to produce a dry, storable, noncaking product, the reducing sugars content of which is within the said range of 32% to 54% and is intermediate that of said high conversion syrup and said low conversion syrup and within a range that would normally characterize a hygroscopic product produced by direct conversion without blending.

OTTOMAR WOLFF.